F. G. GALE.
CHAIN.
APPLICATION FILED JUNE 15, 1916. RENEWED OCT. 3, 1919.

1,341,052.
Patented May 25, 1920.

Inventor.
Francis G. Gale
by Heard Smith & Tennant.
Attys.

UNITED STATES PATENT OFFICE.

FRANCIS G. GALE, OF WATERVILLE, QUEBEC, CANADA.

CHAIN.

1,341,052.  Specification of Letters Patent.  Patented May 25, 1920.

Application filed June 15, 1916, Serial No. 103,714. Renewed October 3, 1919. Serial No. 328,331.

*To all whom it may concern:*

Be it known that I, FRANCIS G. GALE, a subject of the King of Great Britain, residing at Waterville, Province of Quebec, Dominion of Canada, have invented an Improvement in Chains, of which the following description, in connection with the accompanying drawing, is a specification, like characters on the drawing representing like parts.

This invention relates to chains and has for its object to provide a novel chain in which the links all occupy the same plane, thus making a flat chain. In my improved chain each link presents two parallel straight sides which are connected at their ends by end portions, and the end portions are so shaped that when the links are interlooped with each other to form a complete chain said links all occupy the same plane and the sides of the adjacent links are in alinement with each other. This makes a flat chain which is useful for various purposes.

In order to give an understanding of my invention, I have illustrated in the drawings a selected embodiment thereof which will now be described, after which the novel features will be pointed out in the appended claims.

In the drawings, Figure 1 is an edge view of a few links of a chain embodying my invention;

Figure 1:
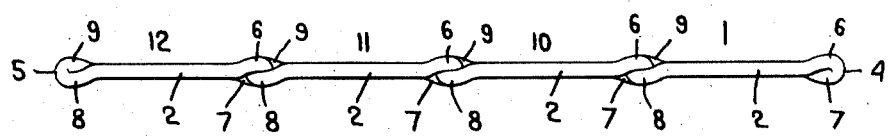
Figure 2:
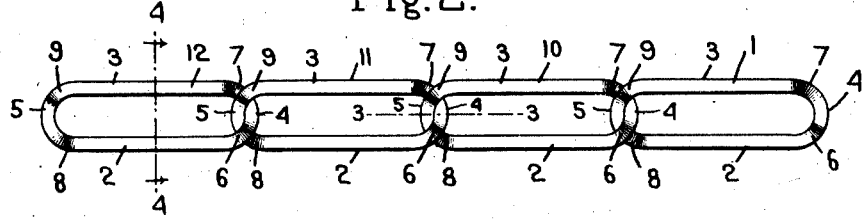
Fig. 2 is a plan view thereof.
Figure 3:
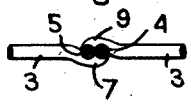
Fig. 3 is a section on the line 3—3, Fig. 2.
Figure 4:
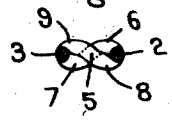
Fig. 4 is a section on the line 4—4, Fig. 2.
Figure 5:
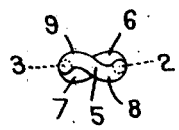
Fig. 5 is an end view of one of the links.

1, 10, 11 and 12 designate a plurality of interlooped links of a chain embodying my invention. These links are so constructed that they all occupy the same plane when they are interlooped, thus making a flat chain. Each link of my improved chain presents the two sides 2 and 3 connected by the end portions 4 and 5. The sides 2 and 3 are preferably straight and parallel to each other. The end portions 4 and 5 are especially formed so as to permit the links to all lie in the same plane. The end portion 4, for instance, is made with an offset 6 adjacent the side 2 and with an offset 7 in the opposite direction adjacent the side 3. The end 5 of the link is formed with an offset or bend 8 adjacent the side 2 and with an oppositely-directed offset or bend 9 adjacent the end of the side 3. The two offsets or bends 6 and 8 at the ends of the side 2 extend in opposite directions and the two offsets or bends 7 and 9 at opposite ends of the side 3 also extend in opposite directions. When the links of the chain are interlooped, the offset portion 8 of one link lies in the offset portion 6 of the adjacent link and the offset portion 9 of one link lies in the offset portion 7 of the adjacent link. By making the end portions 4 and 5 of the links of the sinuous shape resulting from the oppositely-disposed offsets above described, the interlooped links will all lie in the same plane and a flat chain will be presented.

It will be noted that the offset portions of the links which fit into each other and permit the links to lie in parallel relation are confined entirely to the end portions 4 and 5 of each link, the sides 2 and 3 of the links being straight and parallel.

My improved chain can be made as strong as any ordinary chain where the links are interlooped, but it has the advantage that the links all lie parallel to each other.

Further the links of my improved chain will all lie in the same plane even when the chain is under tension, the construction being such that there is no tendency for the chain to twist any when it is placed under tension.

I claim:

1. A chain comprising a plurality of similar interlooped links, each link presenting two parallel sides, and end portions connecting said sides, the end portions for each link being similar in shape and the sides of the links all occupying the same plane.

2. A chain comprising a plurality of similar interlooped links, each link presenting two parallel sides connected by end portions, the two end portions of each link having the same shape and the sides of the links all occupying the same plane with the link sides on each edge of the chain in alinement with each other.

3. A chain comprising a plurality of similar interlooped links, each link being symmetrical in shape and presenting two parallel sides connected by two similar end portions, said end portions being shaped to permit the sides of the links on each edge of the chain to be in alinement with each other.

4. A chain formed of a plurality of similar interlooped links each presenting two parallel straight sides connected by ends, and each end of each link being offset first in one direction and then in the other to receive similar offset portions of the adjacent link whereby a flat chain is presented with the sides thereof all occupying the same plane.

In testimony whereof, I have signed my name to this specification.

FRANCIS G. GALE.

Witnesses:
 ALESCINA JONCAS,
 VIOLA KEES.